Nov. 19, 1968   J. T. PERRIN   3,411,970
FORMATION OF LAMINATES OF RUBBER AND CORD

Filed Nov. 1, 1967   2 Sheets-Sheet 1

INVENTOR
Jack T. Perrin
BY McCoy, Greene, Medert
& Te Grotenhuis
ATTORNEYS

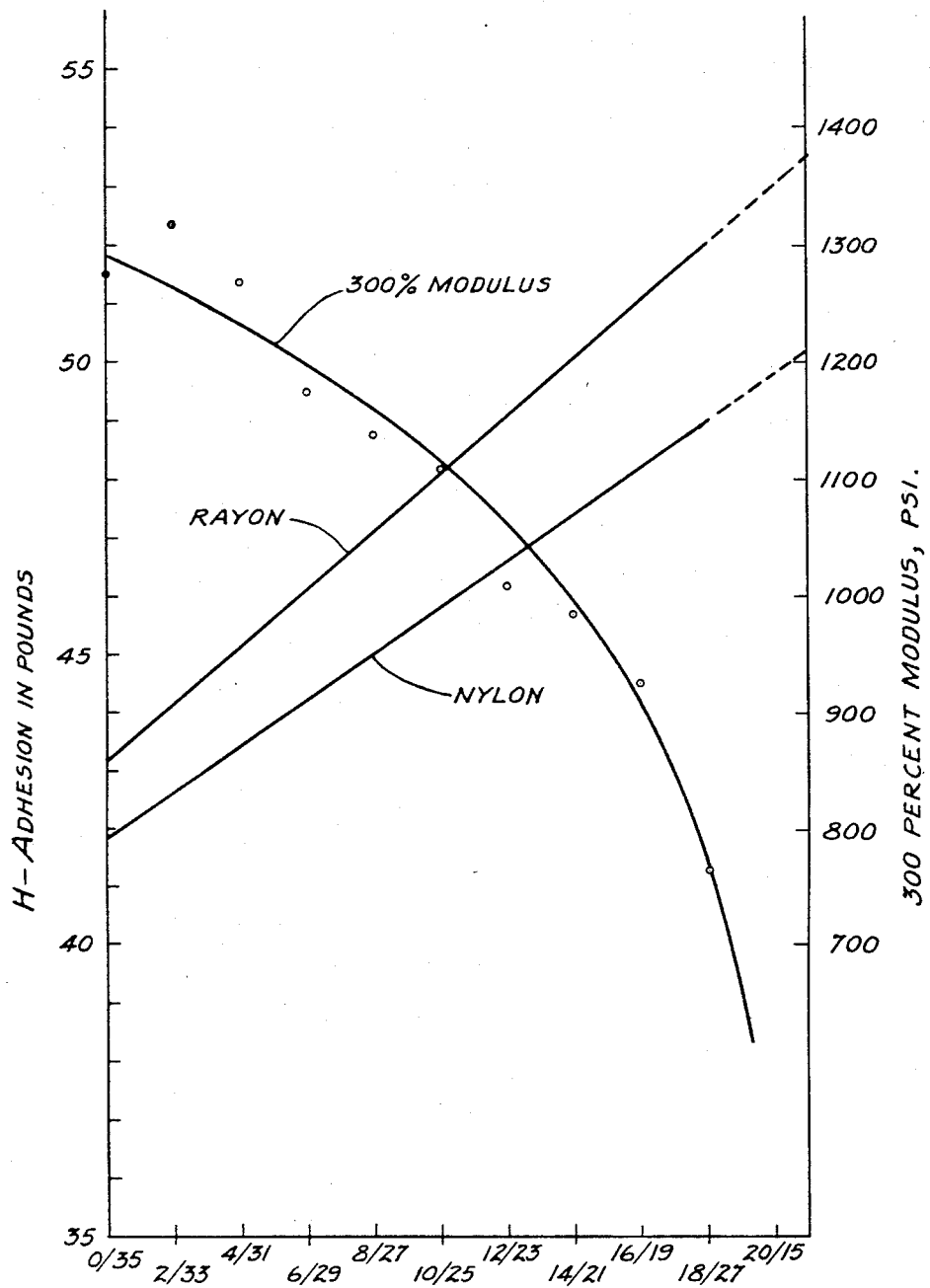

United States Patent Office 3,411,970
Patented Nov. 19, 1968

3,411,970
FORMATION OF LAMINATES OF
RUBBER AND CORD
Jack T. Perrin, Cuyahoga Falls, Ohio, assignor to The
General Tire & Rubber Company, a corporation of
Ohio
Continuation-in-part of application Ser. No. 348,704,
Mar. 2, 1964. This application Nov. 1, 1967, Ser.
No. 681,602
6 Claims. (Cl. 156—297)

ABSTRACT OF THE DISCLOSURE

The adhesion between cords such as rayon, nylon or polyester cord to rubber formulations containing carbon black as a reinforcing filler is improved by using a small amount of finely divided silica in the formulation. The silica, preferably precipitated hydrated silica, is preferably used in an amount of between about 4 and about 12 parts per 100 parts of the synthetic or natural rubber with the total amount of the reinforcing filler (carbon black and silica) not exceeding about 55 parts. This process does not appear to adversely affect the other properties of the rubber-cord laminate.

---

This application is a continuation-in-part of Ser. No. 348,704, filed on Mar. 2, 1964, and titled "Rubber Composition for Coating Fabric Materials," now abandoned.

In laminates formed of one or more layers of rubber coated cord or textile fabric, such as found in pneumatic tires, flexible hose and V belts, it is particularly desirable to have good adhesion between the cord or textile fabric and the rubber in order to obtain the maximum advantage of the reinforcing value of the fabric. This is particularly important in pneumatic tires which must operate at high speeds and temperatures.

One effective method of providing good adhesion between the cord or textile fabric and the rubber is to dip the material prior to coating it with rubber, in a solution containing a suitable adhesive such as a butadiene-styrene-vinyl pyridine terpolymer latex and a resorcinol-formaldehyde condensation product. Normally, rayon, nylon or polyester cord is used in the carcass portion of pneumatic tires. While adhesive dips provide for satisfactory adhesion between the cord or textile fabric and the rubber, they are not effective to provide optimum adhesion so as to achieve the improved performance characteristics and physical properties which might otherwise result.

The present invention provides for greatly improved adhesion, over that gained solely by the use of presently known cord adhesives, through the use of a small quantity of finely divided silica in the rubber composition used to coat the cord or textile fabric. The finely divided silica may be used to replace a small portion of the carbon black filler used in the rubber composition or may be added to supplement the carbon black. This use of finely divided silica in a proper amount unexpectedly results in an improvement in cord adhesion as well as the tear resistance and heat build-up which are particularly critical in certain applications such as pneumatic tires. Although the following discussion will be devoted primarily to improving pneumatic tires, the teachings of the present invention are also applicable to improving other laminates useful as V belts and the like.

While finely divided silica is a well known filler for imparting some reinforcement to rubber compositions used in the manufacture of pneumatic tires, it has several disadvantages which have prevented it from being accepted as an effective substitute for carbon black. Rubber compounds using silica alone or a substantial portion of silica mixed with carbon black as a filler exhibit a poorer modulus of elasticity and a higher Mooney viscosity than those not containing silica. For example, the force required to stretch a cured rubber sample to 300% of its former length will drop about 40% when the filler is changed from carbon black alone to equal portions of silica and carbon black. This poorer modulus of elasticity results in greater heat build-up in the tread of pneumatic tires.

The Mooney viscosity value (large rotor) of rubber compounds may be expected to increase about 16% when the filler is changed from carbon black alone to equal portions of silica and carbon black. This higher Mooney may result in difficulty in calendering the rubber composition onto cord or textile fabric and is therefore undesirable.

However, when the amount of silica filler used with the carbon black is small (less than 35% of the total quantity of filler), these undesirable characteristics resulting from the use of silica are minimal and not significant. Consequently, the unexpected increase in cord adhesion resulting from the use of small quantities of silica makes its use quite advantageous and results in a notable improvement in over-all performance of the resultant product.

Laminates prepared in this manner generally have as high as a 17% improvement in cord adhesion as determined by the conventional H single-cord adhesion test described in ASTM designation 413–39. This is a single cord type test in which the adhesion is measured by the pull in pounds per inch required to separate the cord from the rubber.

In modifying, according to the present invention, the standard rubber compounds normally used for coating cords and textile fabric, it may be desirable to adjust the cure time and amount of accelerator in order to achieve other optimum physical properties as customary with the unmodified compound. This modification is not difficult and may easily be made using techniques well known in the art.

It has also been found that the heat build-up in tires formed of cord or textile fabric coated with rubber compounds prepared according to the present invention, is lower so that such compounds provide a "cooler" running pneumatic tire. This advantage is believed to be attributable at least in part to the improved cord adhesion.

It was also found that the adhesion loss due to over-curing was considerably less in compounds prepared according to the present invention than in unmodified compounds. This advantage is particularly significant in pneumatic tires which generate varying degrees of heat during operation, thus leading to further curing. Therefore the present invention provides a very definite advantage by providing a tire which can better resist the loss of cord adhesion attributable to extended cure. Also since such tires are "cooler" running, the plies would require more time or speed to reach the critical temperatures which lead to extended curing, and would therefore have a longer effective lifetime.

The silica should be finely divided having an average particle diameter of from about 8 to 35 millimicrons. Alternatively, the finely divided silicas can be defined to have a surface area of from about 100 to 300 square meters per gram. The silica fillers contain about 85 to about 98% $SiO_2$. A silica filler found to be particularly suitable for use in the practice of the present invention is commercially available under the trade designation Hi-Sil 233, a precipitated hydrated silica filler and reinforcing agent containing about 5–15% moisture, sold by the Pittsburgh Plate Glass Company. It has a surface area of about 140 square meters per gram and a particle size of about 22 millimicrons. Other siliceous fillers commercially available include those sold under the trade designation Cab-O-Sil M5, Cab-O-Sil HS-5, and UltraSil 4580 which are anhydrous or very low in moisture. Cab-O-Sil M5 and HS-5 are sold by Cabot Corporation of Boston, Massachusetts and UltraSil 4580 is sold by Henly & Co. of New York, New York.

Normally, from about 4 to about 12 parts by weight of silica or $SiO_2$ to about 100 parts by weight of rubber in the composition is desired to provide the optimum advantages of the present invention and normally from 8 to 10 parts by weight is found to be most effective in standard ply stock compounds.

It is among the objects of the present invention to provide a laminate of rubberized cord or textile fabric having improved adhesion between the fabric material and the rubber.

It is another object of this invention to provide a method of making laminates such as cord or textile fabric reinforced pneumatic tires in which improved cord adhesion is achieved while retaining the desired characteristics of high cure rate, high modulus, high tensile strength and durability.

Other objects, uses and advantages of this invention will become apparent from the following detailed description and accompanying drawings in which:

FIGURE 4 shows a chart with curves plotted according to data taken from Table IV of Example 3.

Figure 1:
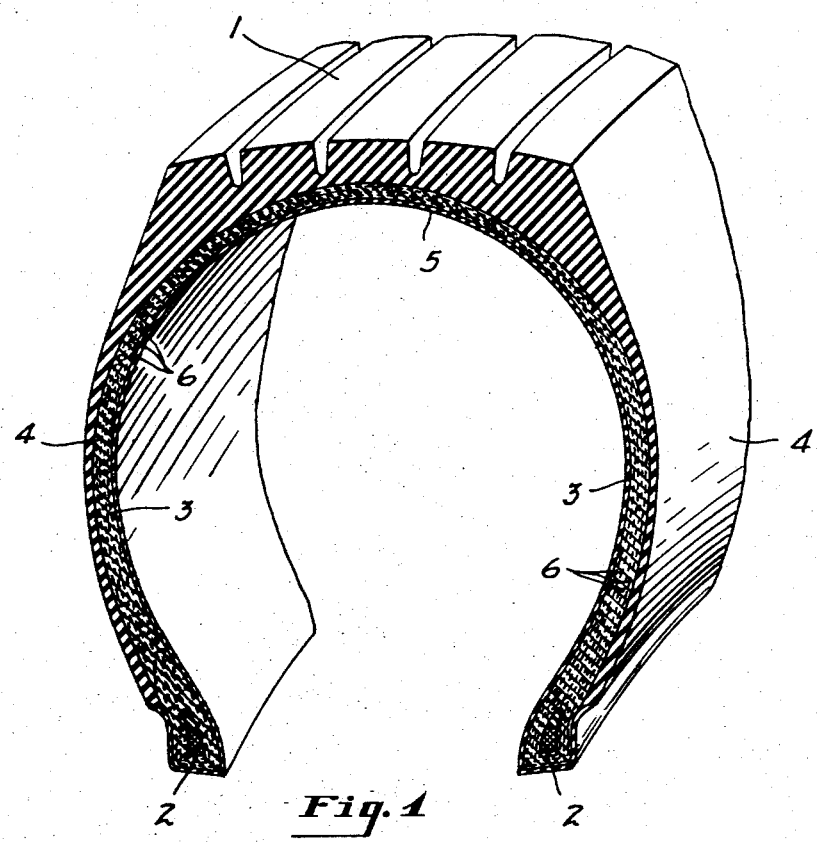
FIGURE 1 is a perspective view of a section of a pneumatic tire having layers of reinforcing material embedded in a ply stock composition embodying the present invention.

Referring more particularly to the drawings, FIGURE 1 shows a tubeless pneumatic tire embodying the present invention wherein layers of conventional tire cord are embedded in the tire carcass and surrounded by rubber of a suitable ply stock composition having dispersed therein a quantity of silica to provide improved adhesion between the tire cord and the rubber. The tire comprises generally a tread portion 1, inextensible beads 2, a tire cord fabric reinforced carcass portion 3, sidewalls 4, and an inner liner 5 adhered across the open interior surface of the tire from bead to bead.

The carcass portion 3 is made up of a plurality of plies of tire cord fabric, each of which consists of a layer of fabric 6 embedded in the rubber. Prior to embedding each individual fabric layer in the rubber which may be accomplished in any of the manners commonly utilized in the production of rubberized cord fabric, a quantity of finely divided silica is dispersed in the ply stock composition in addition to, or in place of a portion of, the conventional filler which is normally carbon black.

Figures 2, 3:
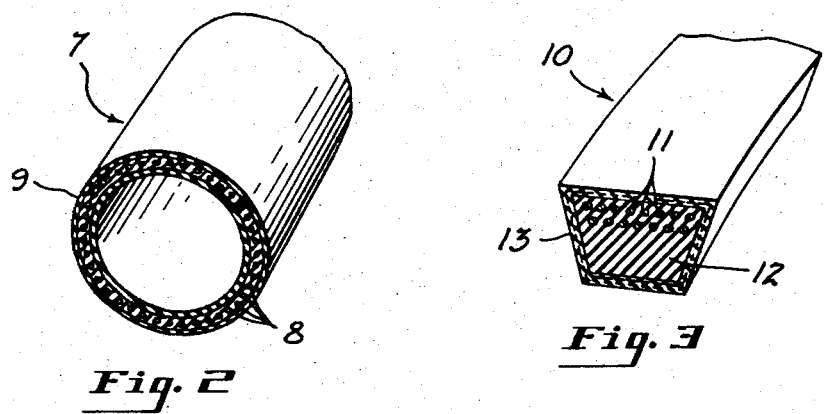
FIGURE 2 is a perspective view of a section of a flexible rubber hose formed of cords embedded in a rubber composition embodying the present invention.
FIGURE 3 is a perspective view of a section of a V belt formed of textile cords embedded in a rubber composition embodying the present invention.

FIGURE 2 shows a section of a flexible rubber hose 7 commonly used to convey a variety of fluids. The hose 7 is formed of a layer of cords 8 which may or may not be in the form of a fabric layer and which are embedded in a rubber composition having dispersed therein, a quantity of silica according to the present invention. An outer coating 9 is provided in order to increase wear and durability.

FIGURE 3 shows a section of a V belt 10 of conventional type having parallel cords 11 embedded in a main body portion 12 of trapezoidal cross section and a rubberized fabric cover layer 13 surrounding the portion 12. The portion 13 is formed of a cord or textile fabric coated with a rubber composition embodying the present invention. The rubber of the main body portion 12 is also of a composition embodying the present invention.

The ply stock composition used to coat the cord or textile fabric is normally a vulcanizable composition of natural rubber, a synthetic rubber polymer or a mixture of natural rubber and a synthetic rubbery polymer, or other vulcanizable or unsaturated polymer which will adhere to adhesive dipped cotton, rayon, nylon or polyester fabric. Varying quantities of polybutadienes, such as cis-polybutadiene or cis-polyisoprene, may also be added to the ply stock composition, along with varying quantities of compatible oil.

The synthetic rubbery polymers used in the ply stocks of this invention are generally homopolymers of conjugated diolefins or copolymers of major proportions of a conjugated diolefin such as butadiene-1, 3, isoprene, dimethyl butadiene, or the like with one or more of styrene, alphaalkylstyrenes (such as alphamethylstyrene), nuclear substituted styrenes (such as vinyl toluene and chloro styrenes), methyl methacrylate, and the like. These synthetic rubbery polymers are preferably sulphur vulcanizable and are preferably compatible with hydrocarbon oils. The non-oil resistant rubbers are usually preferred although rubbery polymers prepared from alkylene oxides such as the rubbery copolymers of propylene oxide etc. with a relatively smaller proportion of an olefinic monoxide such as allyl glycidyl ether, butadiene monoxide etc., are also usable.

In the accompanying claims, the term polymer is used in generic sense to include copolymers as well as homopolymers.

Varying quantities of reinforcing pigment (carbon black etc.) zinc oxide and stearic acid together with curing agents, accelerators and antioxidants are normally added to the ply stock during the compounding of the rubber material. The ply stock material is initially compounded in a Banbury mixer or other internal mixer during a mixing stage. Varying amounts of oil and other rubber ingredients such as glycols, amines, guanidine compounds can also obviously be added in the Banbury mixer or on the mill and dispersed throughout the composition. The oil may be incorporated in the rubber while it is in the form of latex or prior to mixing in the Banbury. Such mixing is well known in the art using conventional mixers of the general type shown in U.S. Patents Nos. 1,881,994, 2,972,774 and 3,294,720.

The carbon black, silica, antioxidant, and oil, with or without zinc oxide, are normally mixed in a first Banbury pass.

The total amount of reinforcing pigment (carbon black and $SiO_2$) in the ply stock should be from about 30 to 55 parts by weight to about 100 parts by weight of rubber, of which about 4 to 12 parts should be $SiO_2$. The carbon black can be semi-reinforcing furnace, easy processing channel, high abrasion or fine extrusion furnace or any carbon black useful in reinforcing rubbery polymers.

The composition is later passed through one or more additional Banbury mixing stages wherein sulphur and varying quantities of suitable accelerators are added. Prior to the calendering of the ply stock composition onto the cord or textile fabric, the fabric is preferably dipped in or coated with a suitable adhesive and is then dried and hot stretched as is customary in the art. The cord or fabric material generally used in the ply layers of pneumatic tires may be either woven or nonwoven filaments or cords of either weftless or woven fabric. A great variety of organic fibers, filaments, cords and fabrics can be employed such as those of cotton, rayon, nylon and/or Dacron (polyester) as well as fibers, cords and fabrics of other natural or synthetic materials and mixtures thereof.

Cords or fabric are dipped in a conventional adhesive or cord dip prior to applying the ply stock. Generally it is an aqueous dip containing about 15–25% total solids content (TSC). The concentration of solids and dipping times are adjusted to deposit the amount of solids needed on the fabric as is well known to the art. A particularly useful latex adhesive is one containing resorcinol-formaldehyde resins (preferably A stage, about 2 mols formaldehyde to 1 mol resorcinol) or other phenolic aldehyde resin together with a rubbery latex such as a latex of a rubbery copolymer of butadiene, styrene and vinyl pyridine as is well known in the art. Other rubbery polymers may be used. In the adhesive, on a dry solids basis, the rubber can be used in an amount of from 70–90 parts by weight and the resin in an amount of from about 30 to 10 parts by weight. After dipping in the adhesive, the cords are dried at temperatures up to about 428° F. or below the temperature at which the cord would be degraded and may be stretched if desired. In some instances with rayon fabric or cord, the resin may be omitted and drying temperatures up to 400° F. used. With polyester cords or fabrics it is much preferred to first treat the cord with a mixture of a blocked diisocyanate (Hylene MP, a bisphenol adduct of 4,4'-diphenyl methane diisocyanate) and an epoxy resin such as Epon 812 which is dried before applying the above resorcinol-formaldehyde-rubber latex adhesive. An example of a suitable epoxide has the general formula

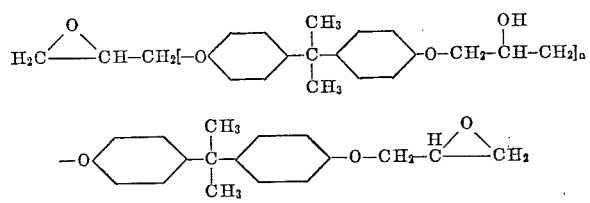

where $n$ is about 3 to 5.

While this invention has been described with particular reference to the manufacture of pneumatic tires, V belts and hose, other products can be made using the process of the present invention such as air springs, tarpaulins, tents, mechanical rubber goods, collapsible containers for liquids and dry powdered materials, inflatable pneumatic closures for receptacles, gaskets and so forth. Moreover, in tires, the invention is not only applicable to ply stocks but can also be used in breaker and chafer stocks etc.

The invention will be better understood by reference to the following illustrative examples.

EXAMPLE 1

Two conventional ply stock compositions were prepared according to the recipes set forth in Table I below:

TABLE I

| Material | Parts by Weight | |
|---|---|---|
| | A | B |
| Natural Rubber | 100 | 50 |
| SBR 1502 | 0 | 50 |
| Carbon Black | ¹ 30 | ² 35 |
| Zinc Oxide | 3 | 3 |
| Stearic Acid | 1 | 1 |
| Antioxidant (Agerite Spar) | 1 | 1 |
| Process Oil (Circosol 2XH or Pine Tar Oil) | 6–8 | 6–8 |
| Primary Accelerator (NOBS #1) | .6–1 | .6–1 |
| Secondary Accelerator (Altax) | .4–.8 | .4–.8 |
| Sulphur | 2.5 | 2.5 |

¹ SRF.  ² HAF.

In the above table, SBR 1502 is a rubbery copolymer of about 72 parts butadiene and 28 parts of styrene copolymerized at about 41° F. and having a Mooney viscosity of about 50 ML-4 at 212° F. SRF, is semi-reinforcing furnace carbon black, and HAF is high abrasion furnace carbon black.

Agerite Spar is a styrenated phenol having the general formula:

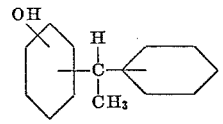

Circosol 2XH is a naphthalene type hydrocarbon oil containing some aromatic oil; NOBS #1 is a blend of N-oxydiethylene benzothiazole-2-sulfenamide and benzothiazyl disulfide; and Altax is a benzothiazyl disulfide accelerator.

The rubber, process oil and carbon black, together with the zinc oxide, stearic acid, and antioxidant were mixed for about 4 to 5 minutes in a high speed Banbury mixer, after which the product was dumped, sheeted and cooled. The product was then passed through a second high speed Banbury mixing stage and finally through a third Banbury stage where the above quantities of primary and secondary accelerator and sulphur were added, after which the product was again dumped, sheeted and cooled.

Several modified ply stock compositions were then prepared based on the recipes for compounds A and B but having dispersed therein, in addition to the carbon black filler, varying amounts of a precipitated, finely divided silica sold under the trade designation Hi-Sil 233.

The rubber sheets thus prepared using both the modified and unmodified composition were then cut to a suitable test size and individually plied with a test cord between two plies and bonded together by curing for 20 minutes at 305° F. in test specimen molds. The specimens were made so as to be adaptable to the conventional H-single cord adhesion test. Specimens for testing with both nylon and rayon cords were prepared for each compound.

The resulting specimens were then tested for cord adhesion. The amount of silica in each compound in parts by weight per 100 parts by weight of rubber in the ply stock is indicated below in Table II together with the H-adhesion in pounds per inch.

TABLE II

| Modified and Unmodified Compounds | Amount of Hi-Sil 233 added (phr.) | H-Adhesion (lbs./in.) | |
|---|---|---|---|
| | | Nylon | Rayon |
| A | 0 | 26.8 | 35.9 |
| A₁ | 3.7 | CB | 42.3 |
| A₂ | 7.4 | CB | 46.1 |
| A₃ | 11.1 | 29.3 | 45.7 |
| B | 0 | CB | 45.7 |
| B₁ | 4 | CB | 53.9 (40) |
| B₂ | 8 | CB | 53.7 (40) |
| B₃ | 12 | CB | 60.9 (80) |

In Table II above, the symbol CB is used to indicate 100% cord breaks and the figure in parentheses indicate also the percent of cord breaks for the particular compound specimens tested.

In the H-adhesion test referred to above each test specimen consists of a single cord of the desired material having each of its end portions embedded in and extending through a strip of the cured ply stock composition. About 1½″ at each end of the cord is embedded in rubber, each rubber strip having dimensions of about 1½″ x ⅜″ x ¼″. The cord is embedded in the rubber prior to curing in a test specimen mold. Each specimen, therefore, is in the general form of the letter H with the horizontal bar of the H being the free portion of the test cord between the two strips.

Table I). However, while these test compounds retained a constant level of 35 parts by weight of filler, the filler varied from carbon black alone to a mixture of approximately equal parts of carbon black and silica (Hi-Sil 233). As the amount of silica was increased the level of primary accelerator (NOBS #1) was also increased proportionately to retain approximately the same level of cure as will be readily understood by those skilled in the art. The amount of accelerator used in each compound is shown in Table IV. The cords tested were rayon and nylon predipped in RFL and dried as shown in Example 1; in both cases the dips were ammoniated.

These compounds were prepared according to the method of Example 1 and were subjected to physical tests the results of which are shown below in Table IV.

TABLE IV.—INFLUENCE ON PHYSICAL PROPERTIES AND H-ADHESION OF VARIABLE RATIOS OF HI-SIL 233 TO CARBON BLACK

| Hi-Sil 233/ HAF (phr.) | NOBS #1 (phr.) | 300% Mod. (p.s.i.) | Tens. (p.s.i.) | Elong. (percent) | Crescent Tear (p.s.i.) | Hardness (Shore A) | Mooney 1¼″ | Mooney 4″ | Scorch at 287° F., min. | H-Adhesion, pounds/inch Nylon | H-Adhesion, pounds/inch Rayon |
|---|---|---|---|---|---|---|---|---|---|---|---|
| 0/35 Control | 0.9 | 1,275 | 3,610 | 560 | 207 | 56 | 57 | 52 | 10.13 | 41.8 | 43.2 |
| 2/33 | 1.0 | 1,315 | 3,380 | 540 | 245 | 57 | 62 | 55 | 10.83 | 43.1 | 43.9 |
| 4/31 | 1.1 | 1,265 | 3,425 | 560 | 276 | 56 | 62 | 56 | 12.40 | 43.7 | 45.1 |
| 6/29 | 1.2 | 1,175 | 3,260 | 543 | 194 | 56 | 65 | 58 | 12.63 | 43.6 | 45.3 |
| 8/27 | 1.3 | 1,140 | 3,030 | 533 | 168 | 56 | 65 | 59 | 13.75 | 46.4 | 48.2 |
| 10/25 | 1.4 | 1,110 | 3,190 | 540 | 137 | 56 | 61 | 56 | 13.55 | 44.8 | 45.3 |
| 12/23 | 1.5 | 1,010 | 3,235 | 563 | 280 | 56 | 66 | 60 | 14.00 | 45.5 | 48.8 |
| 14/21 | 1.6 | 985 | 3,150 | 567 | 190 | 56 | 64 | 57 | 15.00 | 46.6 | 49.1 |
| 16/19 | 1.7 | 925 | 2,980 | 563 | 281 | 57 | 67 | 61 | 14.87 | 47.8 | 51.1 |
| 18/17 | 1.8 | 765 | 3,260 | 643 | 205 | 54 | 66 | 59 | 16.00 | 49.3 | 54.8 |

For testing, the rubber strips at the ends of the cord are placed in the jaws of a Scott tensile testing unit and the force required to pull the cord from the rubber at a jaw separation rate of 6 inches per minute is recorded as H-adhesion value.

The test results shown in Table II clearly indicate the improved cord adhesion in the silica modified compounds.

EXAMPLE 2

Six types of test compounds were prepared according to the general recipe of compound B of Example 1 (see Table I). However, 4 of the compounds had increased amounts of carbon black filler and one of the compounds had 8 parts of Hi-Sil 233 in addition to the 35 parts of carbon black (see compound $B_2$ of Example 1).

These compounds were then tested for 300% modulus, tensile strength at break, elongation at break and H-adhesion. The H-adhesion tests were conducted in the manner described in Example 1 above. The cords used were rayon predipped in RFL and dried as shown in Example 1.

The results of the physical tests are shown in Table III below.

TABLE III

| Modified and Unmodified Compounds | Amounts Carbon Black (SRF phr.) | 300% Modulus (p.s.i.) | Tensile Strength (p.s.i.) | Elongation at Break (Percent) | H-adhesion (lbs./in.) |
|---|---|---|---|---|---|
| B | 35 | 1,510 | 3,260 | 430 | 48.4 |
| $B_{(x)}$ | 39 | 1,760 | 3,210 | 440 | 49.2 |
| $B_{(y)}$ | 43 | 2,070 | 3,240 | 420 | 50.0 |
| $B_{(z)}$ | 47 | 2,250 | 3,190 | 390 | 49.1 |
| $B_1$[1] | [2]35 | 1,520 | 3,290 | 500 | 56.0 |

[1] From Table II.  [2] Plus 8 pts. Hi-Sil 233.

The test results show that while cord adhesion increases with higher carbon black loading, a much higher cord adhesion (16%) can be obtained by the addition of a small quantity of silica without significant change in other physical properties. A comparison of compound $B_{(y)}$ and compound $B_1$ shows that with equal filler loading, there is still a 12% increase in cord adhesion where the total quantity of filler includes 8 parts of Hi-Sil 233.

EXAMPLE 3

A number of test compounds were prepared according to the general recipe of compound B of Example 1 (see Curves showing the effect of increasing the ratio of silica to carbon black on the 300% modulus and on the cord adhesion of the various compounds to rayon and nylon are shown in FIGURE 4. From Table IV and the curves shown in FIGURE 4 it is concluded that from 4 to 12 parts by weight of silica provide the best range for obtaining the advantage of increased cord adhesion without the disadvantage of poor modulus. It is possible of course to avoid any loss of modulus by increasing the carbon black loading and still retaining the desired amount of silica. It will be noted that in the above example, from 8 to 10 parts by weight of silica provided optimum results.

EXAMPLE 4

Two test compounds were prepared according to the general recipe of compound B of Example 1 (see Table I). One of the compounds was the unmodified compound B of Example 1 and the other was a modification of compound B wherein 10 parts of silica were substituted for 10 parts of the carbon black as in one of the compounds shown in Table IV of Example 3.

These test compounds were prepared according to the method of Example 1 and were tested for H-adhesion as in Example 1 and also for heat build-up and permanent set using testing methods which are well known to those skilled in the art.

The results of these tests are shown below in Table V.

TABLE V.—DYNAMIC PROPERTIES OF COMPOUND B AND HI-SIL 233 MODIFICATION

| Test Compound | H-Adhesion (Rayon), lbs./in. | Heat Build-up ΔT°F. 90° F. | Heat Build-up ΔT°F. 212° F. | Permanent Set (Percent), 90° F. | Permanent Set (Percent), 212° F. |
|---|---|---|---|---|---|
| B | 43.2 | 47 | 25 | 1.7 | 3.7 |
| $B_1$[1] | 48.5 | 35 | 24 | 1.6 | 3.9 |

[1] Silica modified.

The test results indicate that the silica modified compound has a 12% improvement in cord adhesion and also has a lower heat build-up particularly at the lower test temperature (90° F.). This indicates that the compound provides a cooler running tire.

Similar silica modified ply compounds were then tested for H-adhesion using rayon cord, at a number of elevated temperatures to see if the improvement in cord adhesion in the silica modified ply stock compound was retained at higher temperatures. (9 parts of silica (Hi-Sil 233) instead of 10 parts were used to replace 9 parts of HAF black in the B compound.) The tests were made according to the H-adhesion test described in Example 1. All cords were predipped in ammoniated RFL and dried prior to applying rubber ply stock as shown in Example 1.

These test results are shown below in Table VI.

TABLE VI.—EFFECT OF ELEVATED TEMPERATURES ON H-ADHESION IN UNMODIFIED AND SILICA MODIFIED COMPOUNDS

| Test Temp. °F.[1] | H-Adhesion, pounds/inch | | Increase in H-Adhesion, Percent |
|---|---|---|---|
| | B | B-Silica Modified | |
| 75 | 45.6 | 53.0 | 16.3 |
| 120 | 35.9 | 42.0 | 17.0 |
| 160 | 28.9 | 33.0 | 14.0 |
| 180 | 26.3 | 32.1 | 22.0 |
| 200 | 24.9 | 28.0 | 12.5 |
| 220 | 22.0 | 26.5 | 20.4 |
| 250 | | 26.3 | |

[1] Samples maintained at this temperature for 30 minutes before testing.

The test results shown above indicate that the improvement in cord adhesion in the silica modified compound is retained at elevated temperatures.

EXAMPLE 5

Four compounds were prepared for testing, two of which were compound B as in Example 1 and the other two of which were silica modified (9 parts Hi-Sil 233 substituted for 9 parts HAF black) as in Example 4, above. The test compounds were then prepared for the H-adhesion test described in Example 1 except that each test specimen was prepared using a different cure time. One specimen of each compound was cured at 305° F. for an optimum cure time as determined by methods well known in the art. The other specimen of each compound was cured for an extended cure time to determine the influence of excessive cure on cord adhesion. The optimum and extended cure times for each test specimen are shown below in Table VII together with the H-adhesion test results. The cords had been previously dipped in ammoniated RFL and dried prior to applying the ply stock as shown in Example 1.

TABLE VII

| Compound | Cure Time (mins.) at 305° F. | H-Adhesion(lbs./in.) | |
|---|---|---|---|
| | | Nylon | Rayon |
| B | 20 | 45.2 | 52.1 |
| B | 30 | 47.6 | 47.4 |
| B (silica unmodified) | 25 | 54.0 | 56.5 |
| B (silica modified) | 40 | 53.2 | 56.4 |

The test results shown in Table VII indicate a smaller loss of cord adhesion due to extended cure in the silica modified compound than in the unmodified B compound.

EXAMPLE 6

A ply stock composition was prepared according to the recipe set forth in Table VIII below.

TABLE VIII

| Material: | Parts by weight |
|---|---|
| Natural rubber | 30 |
| SBR 1502 | 70 |
| Carbon black (HAF) | 27 |
| Silica (Hi-Sil 233) | 8 |
| Zinc oxide | 3 |
| Stearic acid | 1 |
| Antioxidant (Agerite Spar) | 1 |
| Process oil (Circosol 2XH or pine tar oil) | 7 |
| Primary accelerator (NOBS #1) | 1.4 |
| Secondary accelerator (Altax) | .6 |
| Sulphur | 2.5 |

In the above table the materials identified by trade designation are more particularly described in Example 1. The compound was blended in the same manner as that used to prepare the compounds described in Example 1 except that the silica was mixed in the first stage of the Banbury.

The carcass or ply compound thus produced was calendered onto conventional rayon cord fabrics. The cords prior to coating with the rubber ply stock composition were dipped in a conventional aqueous adhesive cord dip (20% TSC) comprising an A stage resorcinol-formaldehyde resin (about 1 part resorcinol to 2 parts formaldehyde) and a butadiene-styrene-vinyl pyridine terpolymer in latex form and dried at a temperature up to about 428° F. Other suitable adhesives which may be used to coat the cords are disclosed in U.S. Patent No. 2,932,901.

The resulting ply fabrics were then applied to a tire building drum over a butyl rubber inner liner sheet that forms the liner 5 (FIGURE 1) to provide the four plys of fabric 6 on the drum. Extruded SBR rubber tread stock material was then applied over the ply layers and the building of the raw or unvulcanized tire was completed on the drum. The tire was then shaped and vulcanized as is customary in the art to provide a tire as shown in FIGURE 1.

A tire prepared in this manner has excellent physical properties including significantly improved cord adhesion and low heat build-up thus providing a cooler running tire.

In the above examples, the rubber polymer may be replaced with other conventional SBR rubber polymers or the like or mixtures of SBR and natural rubbers. Also various types of reinforcing carbon blacks and silicas and various conventional plasticizers and tackifying resins may be employed.

The type of curing agents employed are not critical and various curing systems commonly used in the manufacture of tires may be used. Thus, the type of accelerator may be varied widely as will be apparent to those skilled in the art.

When building tires by the process of this invention, the compositions and procedures may be generally those described in prior art patents such as U.S. Patent Nos. 2,932,901 and 2,561,215. Thus the tire adhesives and tread rubber compositions may be of the type described in those patents and the tire building procedures may be as described in the patents or other conventional procedures may be used. The flat-band process is, of course, preferred.

It will be understood that the above description is by way of illustration rather than limitation and that in accordance with the provisions of the patent statutes, variations and modifications of the specific methods, compositions and articles described herein may be made without departing from the spirit of the invention.

Having described my invention, I claim:

1. In the method of forming a laminate of a cord and a vulcanizable rubbery composition containing between about 30 and about 55 parts of a reinforcing filler per 100 parts of rubber, said filler composed primarily of carbon black, comprising the steps of blending the rubber with the reinforcing filler and other additives including accelerators, curing agents and processing aids, laminating the cord and the rubbery composition together and vulcanizing the composition, the improvement comprising adding between about 4 and about 12 parts of a fine particle size silica containing at least about 85% $SiO_2$ to the rubbery composition in an amount such that the sum total of the silica and the carbon black does not exceed 55 parts to increase the adhesion of the rubber to the cord.

2. The method according to claim 1 wherein the surface of said cord, selected from the group consisting of rayon, nylon and polyester, is pretreated before lamination to render it capable of adhering to the rubbery composition.

3. The method according to claim 2 wherein said cord is pretreated by dipping in an aqueous dip comprising a mixture of a phenolic-aldehyde condensation resin and a rubbery latex containing vinyl pyridine and is thereafter dried.

4. The method according to claim 3 wherein the silica has an average particle diameter of between about 8 millimicrons and 35 millimicrons, a surface area of between about 100 and 300 square meters per gram and a moisture content of between about 5 and about 15%.

5. In a method of adhering a cord to a vulcanizable elastomeric composition containing between about 30 and about 55 parts of a reinforcing filler per 100 parts of elastomer, said filler composition composed primarily of carbon black, the improvement comprising incorporating between about 4 and about 12 parts of finely divided hydrated silica into the composition such that the sum total of the silica and the carbon black is less than about 55 parts, said addition serving to increase the adhesion between the cord and the elastomeric composition.

6. The method of claim 5 wherein the silica has an average particle size of about 22 millimicrons, a surface area of about 140 square meters per gram and a moisture content of more than 5%.

References Cited

UNITED STATES PATENTS

| | | | |
|---|---|---|---|
| 2,561,215 | 7/1951 | Mighton | 161—227 |
| 2,578,605 | 12/1951 | Sears et al. | 260—41.5 |
| 2,597,872 | 5/1952 | Iler | 260—29.6 |
| 2,732,360 | 1/1956 | Voigt et al. | 260—41.5 |
| 2,817,616 | 12/1957 | Wolfe | 57—153 |
| 2,983,705 | 5/1961 | Baldwin et al. | 260—45.8 |
| 3,160,595 | 12/1964 | Hardman et al. | 260—41.5 |
| 3,302,680 | 2/1967 | Rote et al. | 156—334 X |
| 3,317,446 | 5/1967 | Wilder | 260—27 |
| 3,331,795 | 7/1967 | Hopper | 260—41.5 X |

HAROLD ANSHER, *Primary Examiner.*